United States Patent
Kojima et al.

(10) Patent No.: US 11,378,738 B2
(45) Date of Patent: Jul. 5, 2022

(54) OPTICAL FIBER

(71) Applicant: SHIN-ETSU CHEMICAL CO., LTD., Tokyo (JP)

(72) Inventors: Hiroki Kojima, Chiba (JP); Dai Inoue, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/228,707

(22) Filed: Apr. 13, 2021

(65) Prior Publication Data
US 2021/0333471 A1 Oct. 28, 2021

(30) Foreign Application Priority Data

Apr. 23, 2020 (JP) .............................. JP2020-076680
Feb. 16, 2021 (JP) .............................. JP2021-022308

(51) Int. Cl.
| G02B 6/036 | (2006.01) |
| G02B 6/02 | (2006.01) |
| G02B 6/28 | (2006.01) |
| G02B 6/122 | (2006.01) |

(52) U.S. Cl.
CPC ....... *G02B 6/0365* (2013.01); *G02B 6/02004* (2013.01); *G02B 6/2848* (2013.01); *G02B 6/03638* (2013.01); *G02B 6/1223* (2013.01)

(58) Field of Classification Search
CPC .............. G02B 6/02004; G02B 6/0365; G02B 6/1223; G02B 6/2848
See application file for complete search history.

(56) References Cited

U.S. PATENT DOCUMENTS

| 4,852,968 A | 8/1989 | Reed | |
| 6,804,441 B2 * | 10/2004 | Arai | G02B 6/02242 |
| | | | 385/123 |
| 8,081,854 B2 * | 12/2011 | Yoon | G02B 6/0283 |
| | | | 385/124 |

(Continued)

FOREIGN PATENT DOCUMENTS

| JP | 2014142613 A | * 8/2014 | .......... G02B 6/0365 |
| JP | 5799903 B2 | 10/2015 | |

OTHER PUBLICATIONS

Extended European Search Report in EP Application No. 21168439.4, dated Sep. 24, 2021, 10pp.

*Primary Examiner* — Daniel Petkovsek
(74) *Attorney, Agent, or Firm* — Hauptman Ham, LLP

(57) ABSTRACT

An optical fiber includes a core with radius r1, a first clad layer with outermost radius r2 adjacent to the core at radial position r1 and covering the outer periphery of the core, a second clad layer with outermost radius r3 adjacent to the first clad layer at radial position r2 and covering the outer periphery of the first clad layer, and a third clad layer adjacent to the second clad layer at radial position r3 and covering the outer periphery of the second clad layer. The refractive index of the first clad layer decreases continuously from the inside to the outside, reaching a maximum value at radial position r1 and a minimum value at radial position r2. The refractive index of the second clad layer increases continuously from the inside to the outside, reaching a minimum value at radial position r2 and a maximum value at radial position r3.

12 Claims, 2 Drawing Sheets

(56) References Cited

U.S. PATENT DOCUMENTS

| | | |
|---|---|---|
| 8,121,453 B2 * | 2/2012 | Oyamada ............ G02B 6/0365 385/126 |
| 2010/0158460 A1 | 6/2010 | Yoon et al. |
| 2019/0293885 A1 | 9/2019 | Bookbinder et al. |

* cited by examiner

OPTICAL FIBER

CROSS-REFERENCE TO RELATED APPLICATION

This non-provisional application claims priority under 35 U.S.C. § 119(a) from Japanese Patent Application No. 2020-076680, filed on Apr. 23, 2020, and Japanese Patent Application No. 2021-022308, filed on Feb. 16, 2021, the entire contents of which are incorporated herein by reference.

BACKGROUND

Technical Field

The present invention relates to an optical fiber for optical communications, and in particular to an optical fiber having transmission characteristics such as cutoff wavelength, mode field diameter, and zero-dispersion wavelength equivalent to those of conventional single-mode optical fibers, while having low transmission loss due to bending and reduced transmission loss at each wavelength.

Background Art

Conventional single-mode optical fibers are characterized by the fact that the signal light propagates through the core of the optical fiber and that it is possible to transmit signals even when the optical fiber is somewhat bent. In general, as the bending radius of a single-mode optical fiber decreases, the proportion of light that leaks out of the core without being able to propagate increases exponentially, and this appears as an increase in transmission loss. This is the bending loss. In recent years, optical fibers may be used in a bent state with a curvature radius of less than 15 mm to 10 mm, while optical fibers with lower loss are required.

To reduce the bending loss, it is effective to increase the refractive index of the core to concentrate the light more on the core. This can be improved by reducing the mode field diameter (MFD). For this reason, an optical fiber with an MFD of about 8.2 to 8.8 µm is often used conventionally. By doing so, for example, a bending loss of 0.5 dB/turn or less has been achieved at a wavelength of 1550 nm when an optical fiber is wound around a mandrel (cylinder) of r10 mm.

However, since the MFD of the ITU-TG.652.D standard optical fiber, which is generally used in long-distance optical communications, is about 8.8 to 9.6 µm, there is a problem that the connection loss due to the difference in MFD becomes large when connecting an optical fiber with reduced bending loss as described above with an optical fiber that complies with the standard.

To solve this problem, U.S. Pat. No. 4,852,968 discloses that trench-type optical fibers can be used to reduce bending loss while designing a large MFD. This is a technology that has been known for a long time, but in recent years, its excellent bending loss characteristics have been attracting attention.

However, in the case of an optical fiber with a trench-type refractive index distribution, since there is an interface where the glass composition changes significantly, residual stress is generated in the region where the refractive index changes significantly, and this residual stress becomes a cause of an increase in transmission loss. Since this transmission loss has a small wavelength dependence, it is not absorption loss caused by specific impurities, and is generally referred to as structural imperfection loss.

Japanese Patent No. 5799903 discloses an attempt to reduce structural irregularity loss by defining the slope in the refractive index distribution of the clad portion of the trench. However, the method described in Japanese Patent No. 5799903 defines only a part of the clad and does not sufficiently reduce structural irregularity loss.

SUMMARY OF THE INVENTION

Problems to be Solved by the Invention

In view of the above conventional technology, the present invention aims to provide an optical fiber having a refractive index distribution with less structural imperfection.

Means for Solving the Problems

The optical fiber according to the first aspect of the present invention consists of a core with radius r1 at the center, a first clad layer with outermost radius r2 adjacent to the core at radial position r1 and covering the outer periphery of the core, a second clad layer with outermost radius r3 adjacent to the first clad layer at radial position r2 and covering the outer periphery of the first clad layer, and a third clad layer adjacent to the second clad layer at radial position r3 and covering the outer periphery of the second clad layer. The refractive index of the first clad layer decreases continuously and gently from the inside to the outside, reaching a maximum value at the radial position r1 and a minimum value at the radial position r2. The refractive index of the second clad layer increases continuously and gently from the inside to the outside, reaching a minimum value at the radial position r2 and a maximum value at the radial position r3.

In the present invention, it is preferable that the relationship of $|d\Delta(r)/dr| \leq 0.3\%/\mu m$ is established in the range of r from 0 to r1, and the relationship of $|d\Delta(r)/dr| \leq 0.05\%/\mu m$ is established in the range of r from r1 to r2, and the relationship of $|d\Delta(r)/dr| \leq 0.1\%/\mu m$ is established in the range of r from r2 to r3.

In the present invention, the core may have a maximum relative refractive index difference of $\Delta 1$ max, the first clad layer may have a relative refractive index difference of $\Delta 2$ at radial position r1 and a minimum relative refractive index difference of $\Delta 3$ min at radial position r2, and the second clad layer may have a relative refractive index difference of $\Delta 4$ at radial position r3, where $\Delta 1$ max$>\Delta 2$, $\Delta 2>\Delta 3$ min, $\Delta 4>\Delta 3$ min, and $\Delta 2=\Delta 4$.

In the present invention, the slope of the refractive index distribution shape curve may change from negative to positive near the radial position r2, where the first clad layer and the second clad layer come into contact.

In the present invention, the positive dopant added to the core may have a concentration distribution in the radial direction, and the positive dopant may be added so that the maximum value of the relative refractive index difference based on the average refractive index of the third clad layer is 0.30 to 0.50%.

In the present invention, the negative dopant added to the first and second clad layers may be added so that the relative refractive index difference based on the average refractive index of the third clad layer is −0.20 to −0.03%.

In the present invention, the positive dopant may be germanium and/or chlorine, and the negative dopant may be fluorine.

In the present invention, the optical fiber may have an attenuation of less than about 0.1845 dB/km at a wavelength of 1550 nm. The optical fiber may have a bending loss of 0.5 dB/turn or less at a wavelength of 1550 nm when bending of 10 mm radius is applied. The optical fiber may have a zero-dispersion wavelength of 1300 to 1324 nm. The optical fiber may have a mode field diameter of 8.8 to 9.6 μm at 1310 nm. The optical fiber may have a cutoff wavelength of 1260 nm or less, measured at a fiber length of 22 m.

The summary clause does not necessarily describe all features of the embodiments of the present invention. The present invention may also be a sub-combination of the features described above.

Effect Of the Invention

According to the present invention, it is possible to obtain an optical fiber with low transmission loss and small bending loss while maintaining an MFD of 8.8 to 9.6 μm.

DETAILED DESCRIPTION OF THE EMBODIMENTS

In the following, an embodiment of the present invention is described with reference to the drawings.

Figure 1:
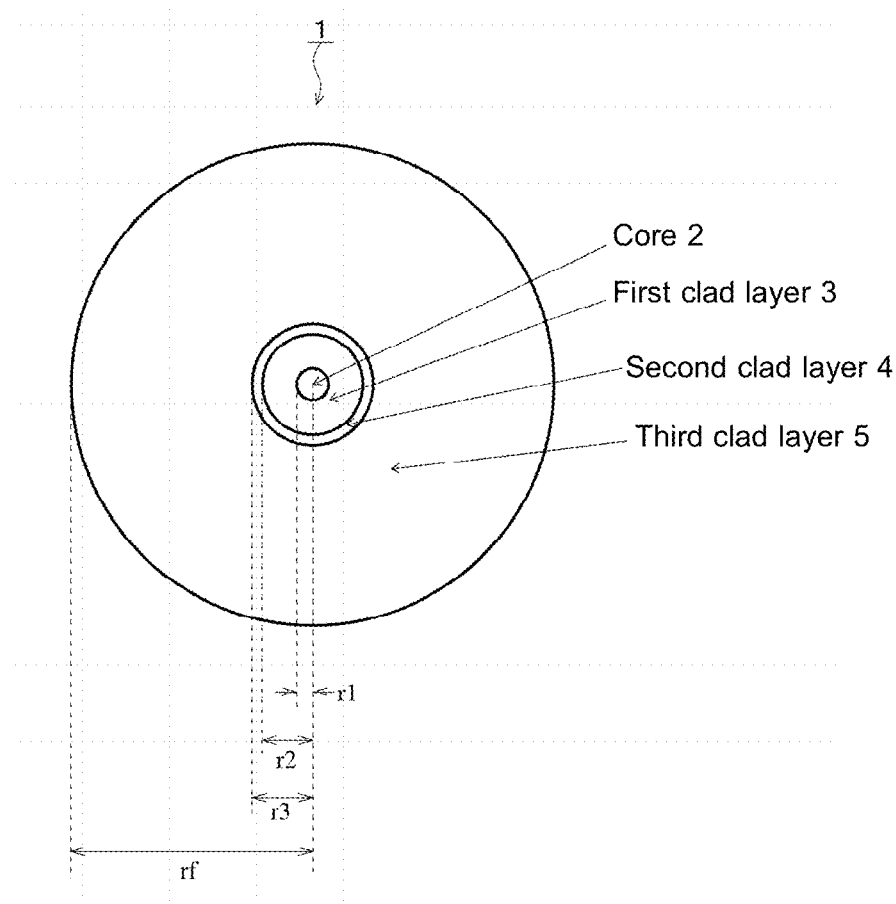
FIG. 1 shows the cross-sectional structure of the optical fiber 1 in the present embodiment.
Figure 2:
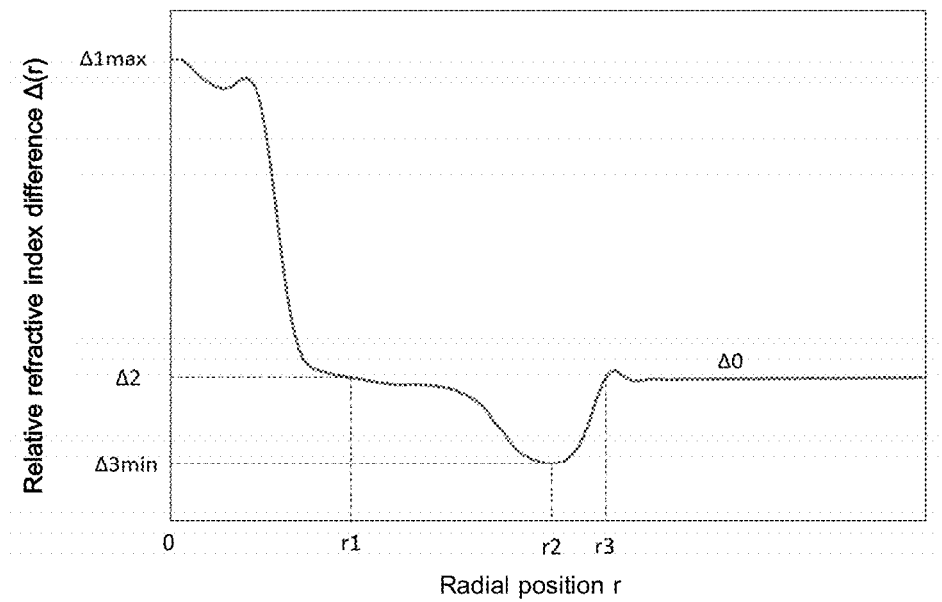
FIG. 2 shows an example of the refractive index distribution structure of the optical fiber 1 in the present embodiment.

FIG. 1 shows the cross-sectional structure of the optical fiber 1 in the present embodiment. FIG. 2 shows an example of the refractive index distribution structure of an optical fiber 1 in the present embodiment. The optical fiber in this embodiment has low-loss characteristics in transmission loss and bending loss equivalent to or better than those of conventional single-mode optical fibers.

As shown in FIG. 1, the optical fiber 1 has a trench-type refractive index distribution structure with a three-layer clad structure. Namely, the optical fiber 1 consists of a core 2 with radius r1 at the center, a first clad layer 3 with outermost radius r2 adjacent to the core 2 at radial position r1 and covering the outer periphery of the core 2, a second clad layer 4 with outermost radius r3 adjacent to the first clad layer 3 at radial position r2 and covering the outer periphery of the first clad layer 3, and a third clad layer 5 adjacent to the second clad layer 4 at radial position r3 and covering the outer periphery of the second clad layer 4. The outer periphery of the third clad layer 5 is at a radial position rf. The outer periphery of the third clad layer 5 is the outermost surface of the optical fiber 1. As shown in FIG. 2, in the refractive index distribution of the optical fiber 1, there is no sharp refractive index change area in core 2, first clad layer 3, and second clad layer 4. In other words, there is no region where the composition changes sharply.

In the present application, the radius of each layer is defined as follows. The refractive index at any radius position (distance from the center) r in the fiber is n(r). r2 is the position where the refractive index is the lowest in the refractive index distribution. When the outer diameter of the fiber is rf, the average refractive index from 1/2rf to rf is n0. r3 is the first r in the refractive index distribution from r2 toward the outside where n(r)=n0. r1 is the first r in the refractive index distribution from the center toward the outside where n(r)=n0.

As shown in FIG. 2, the refractive index of the first clad layer decreases continuously and gently from the inside to the outside, reaching the maximum value at the radial position r1 and the minimum value at the radial position r2. The refractive index of the second clad layer increases continuously and gently from the inside to the outside, reaching the minimum value at the radial position r2 and the maximum value at the radial position r3. In other words, the slope of the refractive index distribution shape curve changes from negative to positive near the radial position r2, where the first clad layer and the second clad layer come into contact.

The relative refractive index difference of each layer is defined as follows: $\Delta(r)$ is the relative refractive index difference at radius position r, and $\Delta(r)$ is defined as follows.

$$\Delta(r)=100 \times (n(r)-n0)/n(r).$$

$\Delta1$ max is the maximum relative refractive index difference in the profile. $\Delta2$ and $\Delta3$ min are respectively defined as follows.

$$\Delta2=\Delta(r1),$$

$$\Delta3 \text{ min}=\Delta(r2)$$

$\Delta0$ is the average relative refractive index difference of $\Delta(1/2rf)$ to $\Delta(rf)$.

In order to adjust the relative refractive index difference of the core to be within the MFD specified in ITU-TG.652.D, it is preferable that the relative refractive index difference of the core is 0.30 to 0.50%. If the relative refractive index difference is less than 0.3%, the refractive index difference with the clad becomes small, and the specified bending loss (e.g., bending loss of 0.5 dB/turn or less at a wavelength of 1550 nm when subjected to bending of a radius of 10 mm) cannot be achieved. If the relative refractive index difference is 0.5% or higher, the dopant concentration in the core increases, and there is concern that the transmission loss will deteriorate due to increased Rayleigh scattering.

It is preferable that the relative refractive index difference between the first and second clad layers is −0.20 to −0.03%. If the relative refractive index difference is larger than −0.03%, the refractive index difference with the core becomes small, and the specified bending loss (e.g., bending loss of 0.5 dB/turn or less at a wavelength of 1550 nm when subjected to bending of a radius of 10 mm) cannot be achieved. If the relative refractive index difference is less than −0.20%, the concentration of negative dopants in the clad increases, and there is concern that the transmission loss will deteriorate due to increased Rayleigh scattering.

Next, the manufacturing method of the single-mode optical fiber of the present invention is explained. First, a porous glass base material consisting of core and intermediate layers is synthesized in one piece by the VAD method. In this process, the core is doped with germanium to increase the refractive index.

The bulk density of the glass particles (soot) can be adjusted by controlling the soot deposition temperature. The higher the bulk density, the more the amount of fluorine doping can be suppressed in the subsequent sintering process in a fluorine atmosphere.

Next, the soot base material is sintered in the following procedure. First, as a de-OH and fluorine doping treatment of the soot base material, the entire length of the soot base material is heat-treated at a sintering temperature of 1200° C. and a pull-down speed of 10 mm/min in a mixed gas atmosphere of Ar=20 L/min, $Cl_2$=0.5 L/min, and $SiF_4$=0.1 L/min in the furnace. Next, as a transparent vitrification treatment, the entire length of the soot base material is heat-treated at a sintering temperature of 1500° C. and a feed speed of 5 mm/min in a gas atmosphere of He=20 L/min in the furnace.

The transparent glass core base material thus obtained is stretched to a predetermined diameter on a glass lathe to make the outer diameters in the longitudinal direction uniform. In this process, though OH groups are incorporated into the surface of the base material due to the oxyhydrogen flame of the glass lathe, the OH groups are removed by immersing the transparent glass core base material in an aqueous hydrofluoric acid solution to dissolve the surface. When stretching on a glass lathe, a plasma flame may be used as the heating source. In that case, the treatment with hydrofluoric acid can be omitted because OH groups are not mixed into the surface of the core base material.

OVD is performed on the transparent core base material thus produced to obtain a porous base material. The obtained porous base material is then sintered and made into a transparent glass to produce the optical fiber base material. By heating the obtained optical fiber base material to about 2100° C. and spinning it, an optical fiber having a diameter of 125 μm can be obtained.

Here, in an optical fiber, a large amount of light passes through the center, and the amount of light passing decreases as the light passes off the center. However, some of the propagating light leaks to the clad region. By reducing the refractive index change in the core and clad regions, it is possible to reduce the structural imperfection loss. In this application, the refractive index change is defined and normalized in terms of $|d\Delta(r)/dr|$ i.e., the magnitude of the radial derivative of the relative refractive index difference $\Delta(r)$, and the range of appropriate values of $|d\Delta(r)/dr|$ at each site is clarified.

Figure 3:
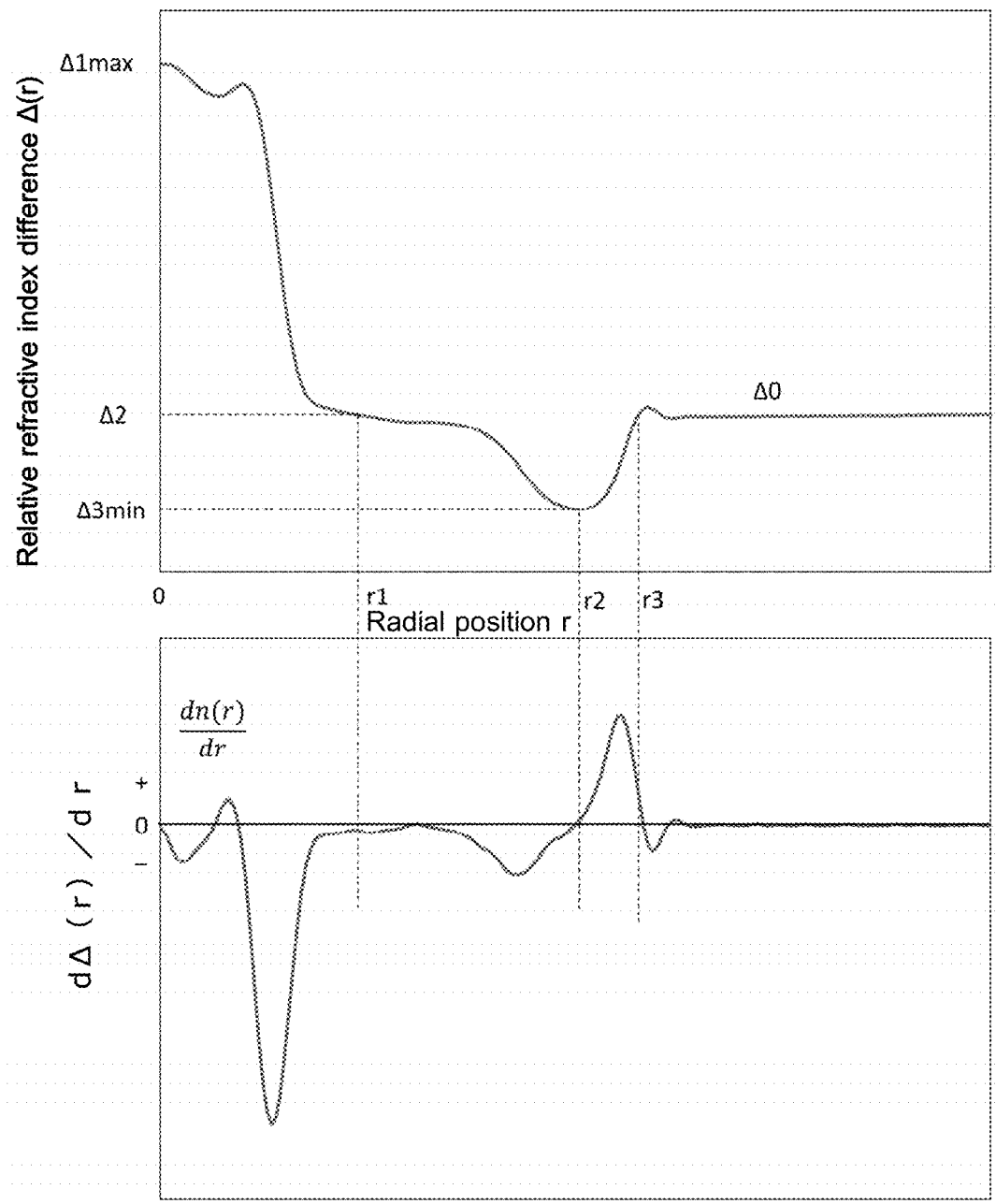
FIG. 3 shows $|d\Delta(r)/dr|$ calculated from the refractive index distribution structure of FIG. 2.

FIG. 3 shows $|d\Delta(r)/dr|$ calculated from the refractive index distribution structure of FIG. 2. The refractive index distribution structure can be obtained by preparing an optical fiber with a diameter of 125 μm and plotting the relative refractive index difference $\Delta(r)$ at a pitch of 0.15 μm. Then, by differentiating the radial distribution of the specific refractive index difference $\Delta(r)$, $d\Delta(r)/dr$ can be obtained. Then, in order to focus only on the steepness of the refractive index change while ignoring the direction of the change (increase or decrease), $|d\Delta(r)/dr|$ which is the absolute value of $d\Delta(r)/dr$, is obtained.

Hereinafter, the range of appropriate values of $|d\Delta(r)/dr|$ at each site and the points to be considered in the manufacturing method for realizing the $|d\Delta(r)/dr|$ will be described.

First, it is preferable that the value of $|d\Delta(r)/dr|$ (0 to r1) is less than 0.3%/μm. The absence of sharp refractive index changes, i.e., the suppression of large changes in the glass composition, allows for the reduction of structural imperfection loss.

To reduce the $|d\Delta(r)/dr|$ (0 to r1), it is preferable to adjust the pull-down speed during sintering. Specifically, by slowing down the pull-down speed, the diffusion of central Ge into the clad can be promoted, and the $|d\Delta(r)/dr|$ (0 to r1) can be reduced. Increasing the chlorine concentration during dehydration can also reduce the $|d\Delta(r)/dr|$ (0 to r1).

It is preferable that the value of $|d\Delta(r)/dr|$ (from r1 to r2) is less than 0.05%/μm. When $|d\Delta(r)/dr|$ (from r1 to r2) is larger than 0.05, the structural imperfection loss increases due to the sharp change in refractive index.

To reduce the $|d\Delta(r)/dr|$ (r1 to r2), it is preferable to adjust the pull-down speed during sintering. Specifically, by slowing down the pull-down speed, the diffusion of central Ge into the clad can be promoted, and the $|d\Delta(r)/dr|$ (r1 to r2) can be reduced. Increasing the chlorine concentration during dehydration can also reduce the $|d\Delta(r)/dr|$ (r1 to r2). Adjusting the concentration of silicon tetrafluoride during dehydration can also reduce $|d\Delta(r)/dr|$ (r1 to r2). Separating the dehydration process from the fluorine doping process can also reduce $|d\Delta(r)/dr|$ (r1 to r2).

It is preferable that the value of $|d\Delta(r)/dr|$ (from r2 to r3) is less than 0.1%/μm. When $|d\Delta(r)/dr|$ (r2 to r3) is larger than 0.1, the structural imperfection loss increases due to the sharp change in refractive index.

In order to reduce $|d\Delta(r)/dr|$ (r2 to r3), a process to remove fluorine from the surface of the porous glass base material may be inserted between the dehydration process and the vitrification process.

EXAMPLES

Example 1

First, a porous glass base material consisting of a core and an intermediate layer was synthesized in one piece by the VAD method. The core was doped with germanium to increase the refractive index. The porous glass base material was heated to about 1200° C. in a mixed gas flow atmosphere of 1 liter per minute of chlorine gas, 0.1 liter per minute of silane tetrafluoride gas, and 20 liters per minute of Ar gas, and the porous glass base material was pulled down at 10 mm/min for dehydration and fluorine doping. Then the porous glass base material was heated to about 1500° C. to make a solid transparent glass core base material. Instead of silane tetrafluoride gas, methane tetrafluoride or ethane hexafluoride may be used.

This transparent glass core base material was stretched to a predetermined diameter on a glass lathe to make the outer diameters in the longitudinal direction uniform. In this process, though OH groups were incorporated into the surface due to the oxyhydrogen flame of the glass lathe, the OH groups were removed by immersing the transparent glass core base material in an aqueous hydrofluoric acid solution to dissolve the surface. When stretching on a glass lathe, an argon plasma flame may be used as the heating source. In that case, the treatment with hydrofluoric acid can be omitted because OH groups are not mixed into the surface of the core base material.

OVD was performed on the transparent core base material thus produced consisting of core, first clad layer, and second clad layer. The porous base material thus obtained was sintered and made into a transparent glass to produce the optical fiber base material. By heating the obtained base material to about 2100° C. and spinning it, an optical fiber having a diameter of 125 μm was obtained.

Example 2

First, a porous glass base material consisting of a core and an intermediate layer was synthesized in one piece by the VAD method. The core was doped with germanium to increase the refractive index. The porous glass base material was heated to about 1200° C. in a mixed gas flow atmosphere of 1.5 liters per minute of chlorine gas, 0.12 liter per minute of silane tetrafluoride gas, and 20 liters per minute of Ar gas, and the porous glass base material was pulled down at 10 mm/min for dehydration and fluorine doping. Then, the process of heating the porous glass base material at 1300° C. for 1 hour was added as a process to remove fluorine from the surface. In this process, 20 liters per minute of He flowed. Then the porous glass base material was heated to about 1500° C. to make a solid transparent glass core base material. After that, optical fibers were obtained in the same way as in Example 1.

Example 3

First, a porous glass base material consisting of a core and an intermediate layer was synthesized in one piece by the VAD method. The core was doped with germanium to increase the refractive index. The porous glass base material was heated to about 1200° C. in a mixed gas flow atmosphere of 2.0 liter per minute of chlorine gas, 0.14 liter per minute of silane tetrafluoride gas, and 20 liters per minute of Ar gas, and the porous glass base material was pulled down at 10 mm/min for dehydration and fluorine doping. Then, the process of heating the porous glass base material at 1300° C. for 4 hours was added as a process to remove fluorine from the surface. In this process, 20 liters per minute of He flowed. Then the porous glass base material was heated to about 1500° C. to make a solid transparent glass core base material. After that, optical fibers were obtained in the same way as in Example 1.

Comparative Example 1

First, a porous glass base material consisting of a core and an intermediate layer was synthesized in one piece by the VAD method. The core was doped with germanium to increase the refractive index. The porous glass base material was heated to about 1200° C. in a mixed gas flow atmosphere of 0.5 liters per minute of chlorine gas, 0.1 liter per minute of silane tetrafluoride gas, and 20 liters per minute of Ar gas, and the porous glass base material was pulled down at 10 mm/min for dehydration and fluorine doping. Then the porous glass base material was heated to about 1500° C. to make a solid transparent glass core base material. After that, optical fibers were obtained in the same way as in Example 1.

Table 1 shows the various parameters of the optical fiber 1 obtained by the examples and comparative examples.

TABLE 1

|  | | Unit | Example 1 | Example 2 | Example 3 | Comparative Example 1 |
|---|---|---|---|---|---|---|
| Maximum value of $|d\Delta(r)/dr|$ | 0~r1 | %/μm | 0.3 | 0.27 | 0.25 | 0.33 |
|  | r1~r2 |  | 0.05 | 0.04 | 0.03 | 0.06 |
|  | r2~r3 |  | 0.10 | 0.07 | 0.05 | 0.15 |
| Δ | 1max | % | 0.34 | 0.33 | 0.34 | 0.33 |
|  | 2 |  | 0.03 | 0.03 | 0.03 | 0.03 |
|  | 3min |  | −0.11 | −0.13 | −0.15 | −0.12 |
|  | λcc | nm | 1241 | 1255 | 1230 | 1245 |
|  | λ0 | nm | 1305 | 1307 | 1310 | 1306 |
| MFD | 1310 nm | μm | 9.17 | 9.08 | 9.12 | 9.20 |
| Transmission loss | 1550 nm | dB/km | 0.1842 | 0.1832 | 0.1820 | 0.1868 |
| Bending loss | R10 × 1turn | dB | 0.27 | 0.31 | 0.22 | 0.25 |

In Example 1, the transmission loss at a wavelength of 1550 nm was 0.1842 dB/km, and the bending loss of R10×1 turn (one winding with a bending radius of 10 mm) was 0.27 dB, which were low enough. Ge diffused into the first clad, and fluorine was removed from the surface during vitrification, resulting in a reduction of $d\Delta(r)/dr$.

In Example 2, the transmission loss at a wavelength of 1550 nm was 0.1832 dB/km, and the bending loss at R10×1 turn was 0.31 dB, which were lower than those in Example 1. By increasing the chlorine concentration during dehydration, the diffusion of Ge into the first clad was promoted, resulting in a reduction of $|d\Delta(r)/dr|$ (0 to r1) and $|d\Delta(r)/dr|$ (r1 to r2). In addition, by adding the fluorine diffusion process, the $|d\Delta(r)/dr|$ (r2~r3) was reduced. These treatments reduced the structural imperfection loss and lowered the transmission loss at a wavelength of 1550 nm.

In Example 3, the transmission loss at a wavelength of 1550 nm was 0.1820 dB/km, and the bending loss at R10×1 turn was 0.22 dB, which were lower than those in Example 2. By increasing the chlorine concentration during dehydration, the diffusion of Ge into the first clad was promoted, resulting in a reduction of $|d\Delta(r)/dr|$ (0 to r1) and $|d\Delta(r)/dr|$ (r1 to r2). In addition, by extending the fluorine diffusion process time, the $|d\Delta(r)/dr|$ (r2~r3) was reduced. These treatments reduced the structural imperfection loss and lowered the transmission loss at a wavelength of 1550 nm.

In all of the above examples 1 to 3, the zero-dispersion wavelength λ0 was in the range of 1300 to 1324 nm. The mode field diameter at 1310 nm was in the range of 8.8 to 9.6 μm. In addition, the cutoff wavelength λcc measured at a fiber length of 22 m was less than 1260 nm. Each of these characteristics is based on the ITU-T G.652.D Recommendation.

In Comparative Example 1, the transmission loss at a wavelength of 1550 nm was 0.1868 dB/km, and the bending loss at R10×1 turn was 0.25 dB, which were higher than the examples.

What is claimed is:

1. An optical fiber, comprising:
   a core with radius r1,
   a first clad layer with outermost radius r2, adjacent to the core at radial position r1, and covering the outer periphery of the core,
   a second clad layer with outermost radius r3, adjacent to the first clad layer at radial position r2, and covering the outer periphery of the first clad layer, and
   a third clad layer adjacent to the second clad layer at radial position r3, and covering the outer periphery of the second clad layer, wherein:
   the refractive index of the first clad layer decreases continuously from the inside to the outside, the refractive index having a maximum value at the radial position r1 and a minimum value at the radial position r2;
   the refractive index of the second clad layer increases continuously from the inside to the outside, the refractive index having a minimum value at the radial position r2 and a maximum value at the radial position r3;
   the relationship of $|d\Delta(r)/dr| \le 0.3\%/\mu m$ is established in the range of r from 0 to r1;
   the relationship of $|d\Delta(r)/dr| \le 0.05\%/\mu m$ is established in the range of r from r1 to r2; and
   the relationship of $|d\Delta(r)/dr| \le 0.1\%/\mu m$ is established in the range of r from r2 to r3, where $\Delta(r)$ is a relative refractive index difference at radius position r.

2. The optical fiber as claimed in claim 1, wherein
   the core has a maximum relative refractive index difference of $\Delta 1$ max;
   the first clad layer has the relative refractive index difference of $\Delta 2$ at radial position r1, and a minimum relative refractive index difference of $\Delta 3$ min at radial position r2; and
   the second clad layer has the relative refractive index difference of $\Delta 4$ at radial position r3, where $\Delta 1$ max$>\Delta 2$, $\Delta 2>\Delta 3$ min, $\Delta 4>\Delta 3$ min, and $\Delta 2=\Delta 4$.

3. The optical fiber as claimed in claim 1, wherein
   a slope of a refractive index distribution curve of $\Delta(r)$ relative to radius position r changes from negative to positive at the radial position r2 where the first clad layer and the second clad layer come into contact.

4. The optical fiber as claimed in claim 1, wherein
   a positive dopant added to the core has a concentration distribution in the radial direction, and the positive dopant is added so that the maximum value of the relative refractive index difference based on an average refractive index of the third clad layer is 0.30 to 0.50%.

5. The optical fiber as claimed in claim 4, wherein
   the positive dopant is germanium and/or chlorine.

6. The optical fiber as claimed in claim 1, wherein
   a negative dopant added to the first clad layer and second clad layer is added so that the relative refractive index difference based on an average refractive index of the third clad layer is −0.20 to −0.03%.

7. The optical fiber as claimed in claim 6, wherein
   the negative dopant is fluorine.

8. The optical fiber as claimed in claim 1, wherein
   an attenuation of the optical fiber is less than about 0.1845 dB/km at a wavelength of 1550 nm.

9. The optical fiber as claimed in claim 1, wherein
   a bending loss of the optical fiber is 0.5 dB/turn or less at a wavelength of 1550 nm when subjected to bending with a radius of 10 mm.

10. The optical fiber as claimed in claim 1, wherein
    a zero-dispersion wavelength of the optical fiber is 1300 to 1324 nm.

11. The optical fiber as claimed in claim 1, wherein
    a mode field diameter of the optical fiber at 1310 nm is 8.8 to 9.6 μm.

12. The optical fiber as claimed in claim 1, wherein
    the cutoff wavelength of the optical fiber, measured at a fiber length of 22 m, is 1260 nm or less.

* * * * *